Nov. 21, 1933.    I. B. LIMEGROVER    1,936,241
METER CLOCK OR REGISTER
Filed Oct. 17, 1930    3 Sheets-Sheet 2

INVENTOR.
I. B. Limegrover
BY Clarke & Doolittle
ATTORNEYS.

Patented Nov. 21, 1933

1,936,241

UNITED STATES PATENT OFFICE 1,936,241

METER CLOCK OR REGISTER

Isadore B. Limegrover, Verona, Pa.

Application October 17, 1930. Serial No. 489,311

4 Claims. (Cl. 235—120)

My invention relates to improvements in meter clocks or registers of the character employed in fluid meters, pumps or the like, for indicating or registering the quantity measured thereby.

Fluid meters or pumps, as for example, gasoline pumps employed in the vending of gasoline, in addition to means employed for measuring or metering the fluid and delivering the same, are preferably provided with a clock or register for visibly indicating the quantity of said fluid metered and delivered to the purchaser.

It is a prime object of my invention to provide a clock or register of the character designated, actuated by the metering or measuring mechanism of the meter or pump to which it is applied, and so designed and constructed as to accurately indicate or register the quantity delivered by the meter.

My invention contemplates a construction having a minimum of parts; a simple and durable design, having parts which may be readily assembled and operated by one not skilled in the art; and a construction which may be produced at a minimum cost.

Figure 1:
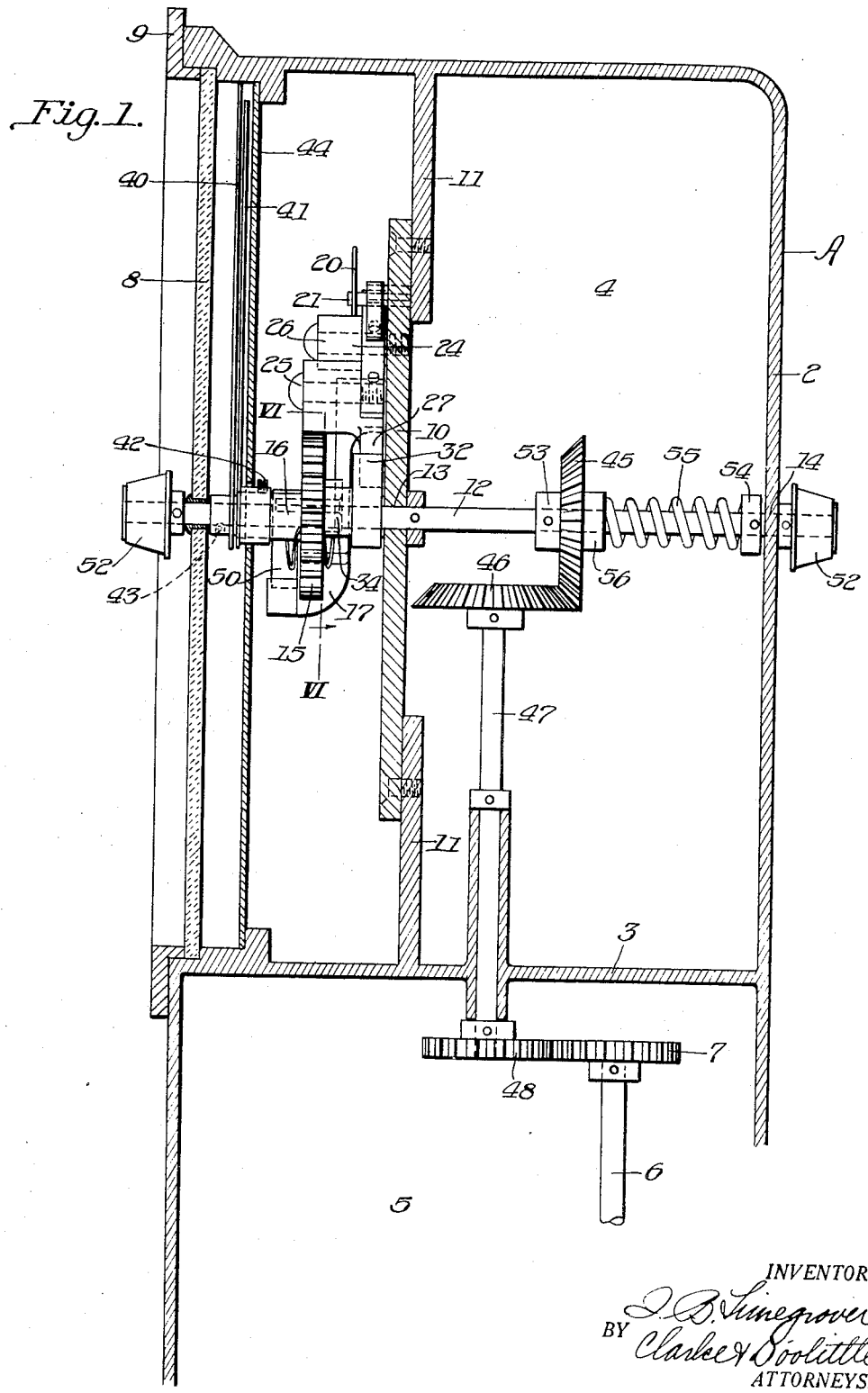
Figure 2:
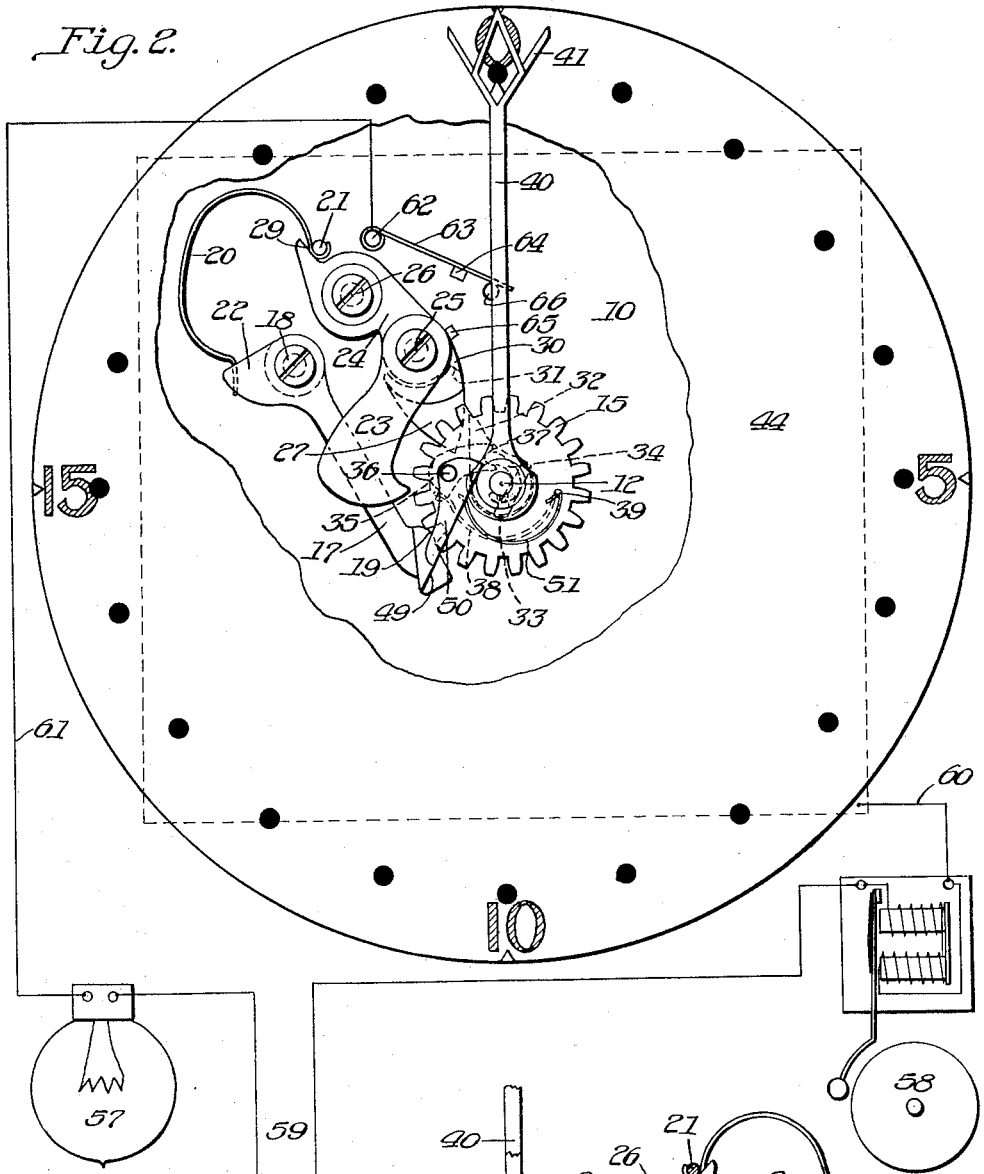
Figure 3:
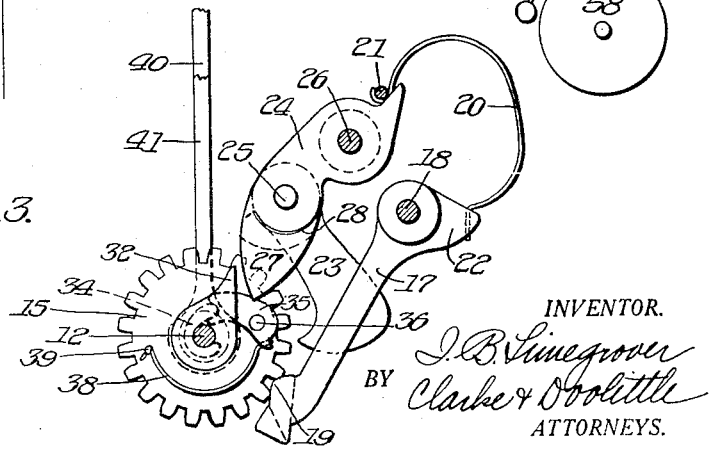
Figure 4:
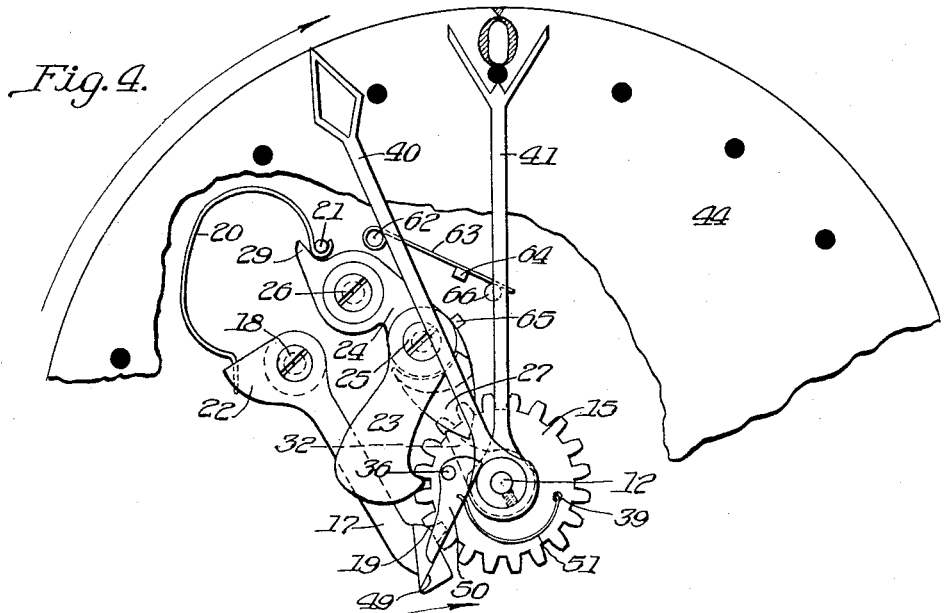
Figure 5:
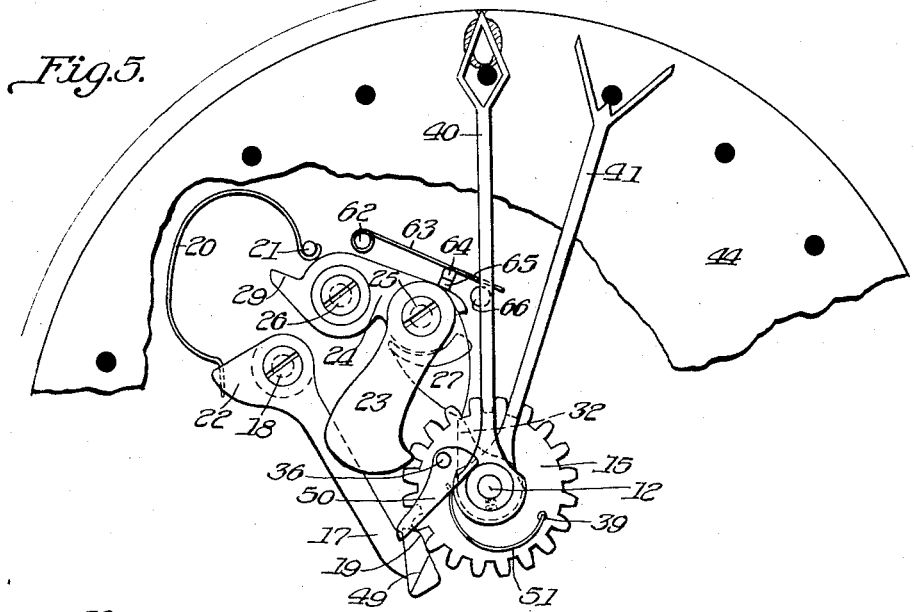

Additional objects and advantages will become apparent from the following specification, taken in connection with the accompanying drawings, wherein:

Fig. 1 is a vertical sectional view taken through the upper portion of a gasoline meter or pump, showing a meter clock or register embodying my invention applied thereto;

Fig. 2, a front elevational view of Fig. 1, partially broken away, and illustrating signal means associated with the meter clock or register;

Fig. 3, a rear elevational view of the parts of Fig. 2;

Fig. 4, a partial view of Fig. 2, showing the parts thereof in advanced position;

Fig. 5, a view of Fig. 4, showing the parts further advanced; and

Figure 6:
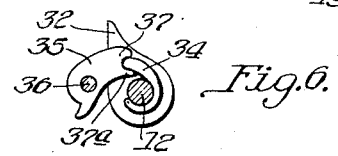

Fig. 6, a detail section on the line VI—VI of Fig. 1, showing the operating cam.

Referring to the drawings, A designates generally a portion of a gasoline meter or pump, comprising an outer casing 2 and a transverse partition 3, the latter dividing the casing into upper and lower cavities 4 and 5 respectively. The lower cavity 5 encloses the metering or measuring mechanism of the pump (not shown) which may be of any desired construction. A vertically extending rotatable shaft 6 is located within the said lower cavity, and is adapted to be rotated by means of the measuring or metering mechanism so that its rotation becomes a function of the means for circulating the quantity of gasoline being measured by the pump. A pinion gear 7 is secured to and rotatable with the shaft 6.

The meter clock or register embodying my invention is disposed within the upper cavity 4 of the pump or meter, being enclosed therein by means of a transparent cover or glass 8, secured to the meter casing by a detachable rim 9. The clock or register mechanism proper is mounted on a vertically disposed base or plate member 10 mounted on suitable vertically alined portions 11 of the meter or pump casing 2. A horizontal shaft 12 is rotatable in the base member as at 13, and in the casing 2 at 14.

Freely mounted on the shaft 12 forwardly of the base member 10, I provide a ratchet 15 in the form of a spur gear, said ratchet having a forwardly extending hub 16. A friction pawl 17 is pivotally secured to the base member as at 18 and has a ratchet-engaging nose 19 thereon, said nose being urged slightly between and into frictional contact with the ratchet teeth by means of an expansion spring 20 having one end thereof secured to a pin or post 21 in the base member, and its other end secured in a pawl extension 22. In this manner, the ratchet 15 may be maintained in any desired position on the shaft 12.

The ratchet 15 is adapted to be rotated by means of a ratchet pawl 23, freely pivoted on a link 24 by means of a pin or screw 25. The link 24 is pivoted to the base member 10 at 26, whereby the pawl and link are free to rotate therefrom due to their own weight, the pawl 23 being disposed in the plane of the ratchet 15 and formed with an angularly extending cam follower 27 rearwardly thereof.

Said pawl and follower are cut away as at 28 to receive a portion of the link 24. The link 24 is normally depended from its pivot 26 in the position of Fig. 2, by means of a stop lug 29 engaging the pin or post 21, and the pawl 23 is depended from said link and assumes the position of Fig. 2 out of engagement with the ratchet 15, by means of a limiting projecting lug 30 on the link engaging a shoulder 31 formed on the pawl.

An operating cam 32 is provided in the plane of the cam follower 27 and is secured to and rotatable with the shaft 12 by a pin 33. A limiting stop or abutment 34 is formed integrally with the cam and is disposed axially thereof, extending toward the ratchet 15. A re-setting dog 35 is pivoted to the rear face of the ratchet 15 by a pin 36, and is formed with a bifurcated end 37 resiliently maintained in the path of the abutment 34 by means of an expansion spring 38 secured to the ratchet 15 at 39. 37a designates an extended portion or lip on the end 37 the function of which is hereinafter more fully described.

Thus, with the ratchet in the position of Fig. 1, by rotating the shaft 12 and its cam 32 in a counter-clockwise direction, the dog 35 will engage the stop 34 to determine the normal or zero position of the cam. With the parts in this relation, the hands 40 and 41 may be applied in superimposed relation, the hand 41 being secured to the ratchet hub 16 by a set-screw 42, and the hand 40 secured to the shaft 12 by means of a set-screw 43. The hands 40 and 41 are respectively a unit hand and a totaling hand, and are adapted to be rotated on a dial 44 having suitable radially disposed indicia thereon. For example, in the case of the gasoline meter or pump shown herein, the indicia comprise twenty equally spaced radial marks indicating gallons.

Rotation of the shaft 12 and the cam 32 in a clockwise direction will rotate the hand 40 around the dial to indicate a single unit or gallon. As the cam is rotated it contacts with its follower 27 as in Fig. 4, to rotate the pawl 23 and the link 24 about the pivot 26, to raise and move the pawl into engagement with the ratchet as in Fig. 4. Continued rotation of the shaft and cam will further rotate the pawl and link about the pivot 26, and the pawl about the pivot 25 on the link, until, when as in Fig. 5, the cam has reached its maximum point, the pawl will have advanced the ratchet 15 one tooth. Further rotation of the said cam will release the follower and the pawl, whereby they will fall by gravity to assume their normal positions. Hence, if the teeth on the ratchet are equal in number to the number of indicia on the dial 44, the hand 41, rotating with the ratchet 15 will be rotated to the first of said indicia. A continued series of rotations of the shaft 12 and the hand 40 will therefore be accurately totalled on the dial 44 by means of the hand 41.

It is to be noted that as the pawl 23 rotates the ratchet 15, the friction pawl 17, by means of its nose 19, assists the rotation of the ratchet to insure a quick and positive movement thereof. As the said ratchet is rotated, a single tooth passes over the nose 19, whereby the spring action of the pawl 17 urges the nose against the said tooth to assist the final rotation thereof. At the instant the cam 32 disengages its follower 27, the nose 19 will again assume its normal position, as shown in Fig. 1, thereby preventing any play in the mechanism.

For the purpose of driving the shaft 12, I provide a pair of bevel gears 45 and 46. The bevel gear 45 may be suitably connected with the shaft 12 and is in mesh with the gear 46 rotatable with and by a vertical shaft 47, said shaft extending downwardly through the casing partition 3 and having a pinion gear 48 thereon engaged with the pinion gear 7 on the shaft 6.

As stated, the rotation of the shaft 6 is a function of the means for circulating the quantity of gasoline measured or metered by the pump A. Therefore, by providing the correct gear ratio between the gears 7 and 48, the shaft 47 may be rotated once for every unit or gallon metered and delivered by the meter or pump A. The total number of gallons may therefore be accurately indicated on the dial 44 by means of the hands 40 and 41.

To enable the re-setting of the hands 40 and 41 to zero, an inclined abutment 49 is formed on the lower end of the friction pawl 17 extending forwardly of the ratchet 15, and is adapted to be engaged by a backstop dog 50. Said backstop dog is pivotally mounted on the forward face of the ratchet 15 by means of the pin 36, and the inclined surface thereof engages the abutment 49 and the ratchet hub 16, being normally retained against the latter by means of an expansion spring 51 having an end thereof secured to the ratchet at 39. Hand knobs 52 are secured to the outer ends of the shaft 12 which projects beyond the glass 8 and the casing 2 for that purpose.

After completion of the delivery of any number of units or gallons by the pump or meter, the front and rear hands 40 and 41 will have been rotated a corresponding amount on the dial 44. To re-set the same, the shaft 12 is rotated counter-clockwise, whereby cam 32 and its abutment 34 are rotated into contact with the bifurcated end of the re-setting dog 35. Continued counter-clockwise rotation will then rotate the ratchet 15 and the hand 41 until the backstop dog 50 engages the abutment 49 on the friction pawl, thereby preventing further rotation and bringing the hands 40 and 41 to the zero position of Figs. 1 and 2.

At some position on the dial, as for example at approximately the eighteenth gallon division thereof, the hands 40 and 41 will move together in superimposed relation for a short arc of travel, and the pawl 23 will be moved into engagement with the ratchet 15. The omission of the elongated lip 37a would permit engagement of the dog 35 with its abutment 34 in the event that the pump, and therefore the register, stops at the said position, thereby preventing re-setting of the hands, due to the engagement of the pawl 23 with its ratchet.

The lip 37a prevents the engagement of the dog and its abutment at this point and thereby prevents locking of the mechanism, and the shaft 12 with the hand 40 may be rotated in a counter-clockwise direction through substantially a complete revolution, to pick up the hand 41 and return both hands to the zero position on the dial.

In order to permit counter-clockwise rotation of the shaft 12 for re-setting, a collar 53 is secured thereto and is adapted to contact with the face of the bevel gear 45. A second collar 54 is secured to the shaft 12 in spaced relationship with respect to the collar 53 and the gear 45, and a tension spring 55 is positioned on the shaft between the said collar 54 and the hub 56 of the gear 45. The spring is of sufficient strength to urge the said gear into intimate contact with the collar 53 to enable the shaft 12 to be driven through the medium of the bevel gear 46 and its shaft 47. However, due to the friction in the gearing connecting the said bevel gears with the operating mechanism of the pump A, the shaft 12 may be rotated as and for the purpose described, without rotating the gearing and operating mechanism.

I have shown in Fig. 2, signal means for visibly and/or audibly indicating the operation of the meter clock, which means include an electric light 57 and a bell 58 connected in series with a source of alternating current indicated by the leads 59. The bell may comprise the ordinary door bell having its breaker points removed or shunted out of operation. The light and bell may be enclosed within the pump casing 2 or mounted in any manner desired to enable the same to be seen and heard.

A conductor 60 of the series circuit connects one terminal of the bell with the base member 10, formed of conductive material, and another conductor 61 connects one terminal of the light 57 with a binding post 62 on and insulated from the said base member, and arranged above the meter clock mechanism. A conductive spring contact arm 63 is secured to the binding post, having a contact 64 thereon designed to co-act with a contact 65 on the link 24, the said link being conductively mounted on the base member. An insulated stop pin 66 is secured in the base member for normally engaging the free end of the contact arm 63.

A complete rotation of the hand 40 on the dial 44, due to the rotation of the link 24 about its pivot 26, will engage the contacts 64 and 65, as in Fig. 5, thereby making the circuit through the light 57 and the magnetic windings of the bell 58. When the filament in the light becomes energized, its instantaneous resistance will reduce the current flowing through the bell windings sufficiently so as to maintain the bell tapper stationary after having struck the bell once. The cycle effect of the alternating current will cause a slight vibration which will not be of sufficient magnitude to produce additional strokes of the bell tapper.

Thus the bell and light will be energized once for every rotation of the hand 40 to provide both an audible and visible signal that one unit or gallon has been indicated by the meter clock or register. The rotation of the link 24 will impart a wiping action to the contacts 64 and 65 whereby the same are kept clean. The circuit provided is free from the dangers of sparking and shorting, thus preventing the ignition of gasoline fumes in the pump. Additional safety may be provided by encasing the signal means in enclosures out of communication with the operating parts of the pump or meter.

A back dial may be readily incorporated with the mechanism of my invention where desired. Other and additional changes and modifications are contemplated provided they fall within the scope of the following claims.

I claim:

1. In a meter clock, a dial having indicia thereon, a rotatable shaft having a unit hand secured thereto, a rotatable ratchet having a totalling hand secured thereto, a pivoted link, a pawl for the ratchet freely pivoted to said link, a cam on the shaft for engaging said pawl to first move the pawl into engagement with the ratchet, and then rotate said ratchet by means of the pawl.

2. In a meter clock, a dial having radially disposed indicia thereon, a unit hand, a rotatable shaft for the unit hand, a totalling hand, a ratchet for the totalling hand freely rotatable on said shaft and having teeth thereon equal in number to the number of indicia on the dial, a pivoted link, a pawl for the ratchet freely pivoted on said link, means operable by a single rotation of the shaft to first move the pawl into engagement with the ratchet, and then rotate said ratchet by means of the pawl through the angular distance of one tooth, thereby rotating the totalling hand a like distance on the dial.

3. In a meter clock, a rotatable shaft having a ratchet freely mounted thereon, a unit hand rotatable with the shaft and a totalling hand rotatable with the ratchet, a dial for said hands, a pawl for the ratchet, means for supporting said pawl for combined pivotal and longitudinal movement, a cam on the shaft for engaging said pawl to first move the pawl into engagement with the ratchet and then rotate said ratchet by means of the pawl, means for releasing the pawl from the ratchet after rotating said ratchet, and a friction pawl resiliently mounted for engagement with the ratchet.

4. In a meter clock, a rotatable shaft having a ratchet freely mounted thereon, a unit hand rotatable with the shaft and a totalling hand rotatable with the ratchet, a dial for said hands, a pawl for the ratchet, means for supporting said pawl for combined pivotal and longitudinal movement, a cam follower on the pawl, a cam rotatable with the shaft and engaging the follower to first move the pawl into engagement with the ratchet, and then rotate said ratchet by means of the pawl, and means for releasing the pawl from the ratchet upon the release of the follower by the cam.

ISADORE B. LIMEGROVER.